Feb. 20, 1934.  A. E. LARSEN  1,948,457
AIRCRAFT SUSTAINING ROTOR
Filed June 29, 1931  5 Sheets-Sheet 1

INVENTOR
Agnew E. Larsen
BY
Synnestvedt & Lechner
ATTORNEYS

Feb. 20, 1934.   A. E. LARSEN   1,948,457
AIRCRAFT SUSTAINING ROTOR
Filed June 29, 1931   5 Sheets-Sheet 2
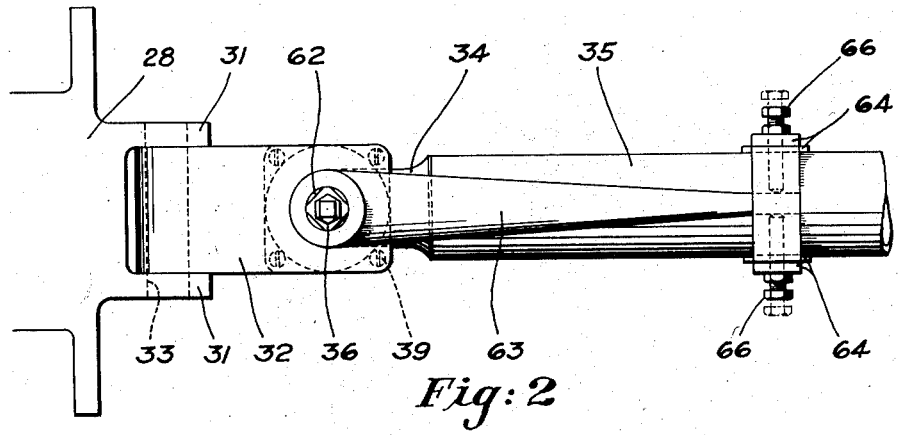
Fig: 2
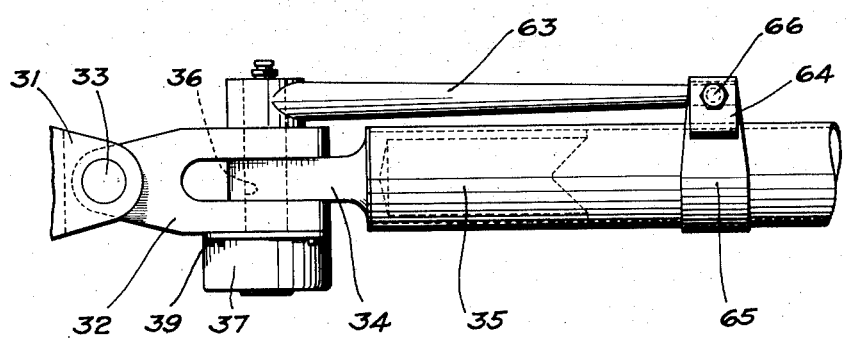
Fig: 3
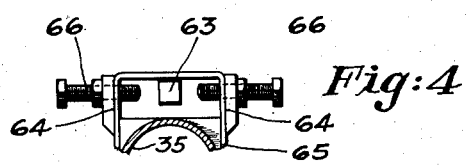
Fig: 4
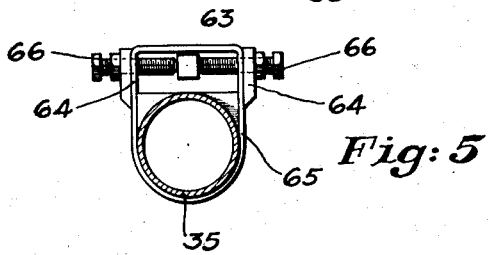
Fig: 5
INVENTOR
Agnew E. Larsen
BY
Synnestvedt & Lechner
ATTORNEYS Feb. 20, 1934.     A. E. LARSEN     1,948,457
AIRCRAFT SUSTAINING ROTOR
Filed June 29, 1931     5 Sheets-Sheet 3
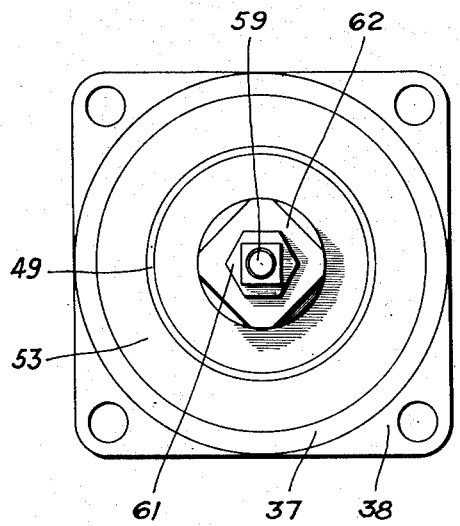
Fig:6
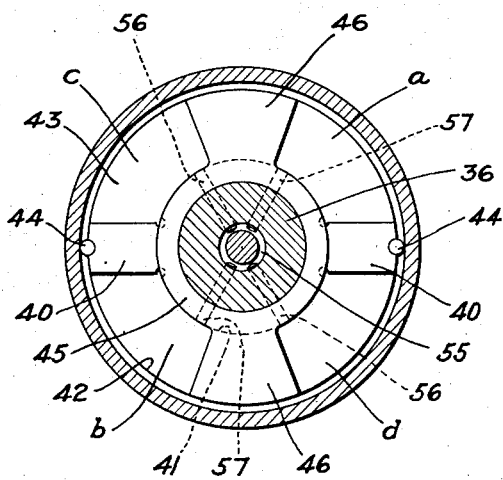
Fig:8
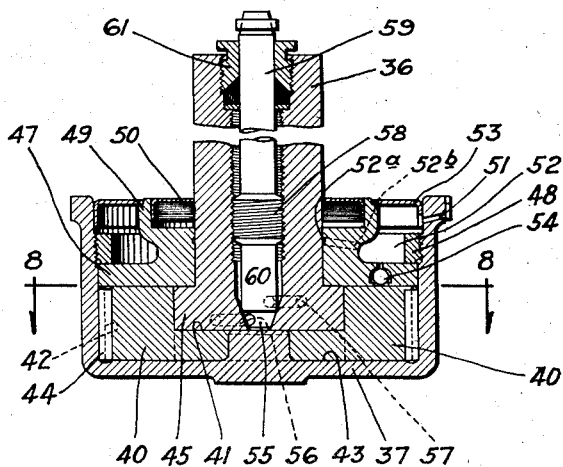
Fig:7

Feb. 20, 1934.    A. E. LARSEN    1,948,457
AIRCRAFT SUSTAINING ROTOR
Filed June 29, 1931    5 Sheets-Sheet 4
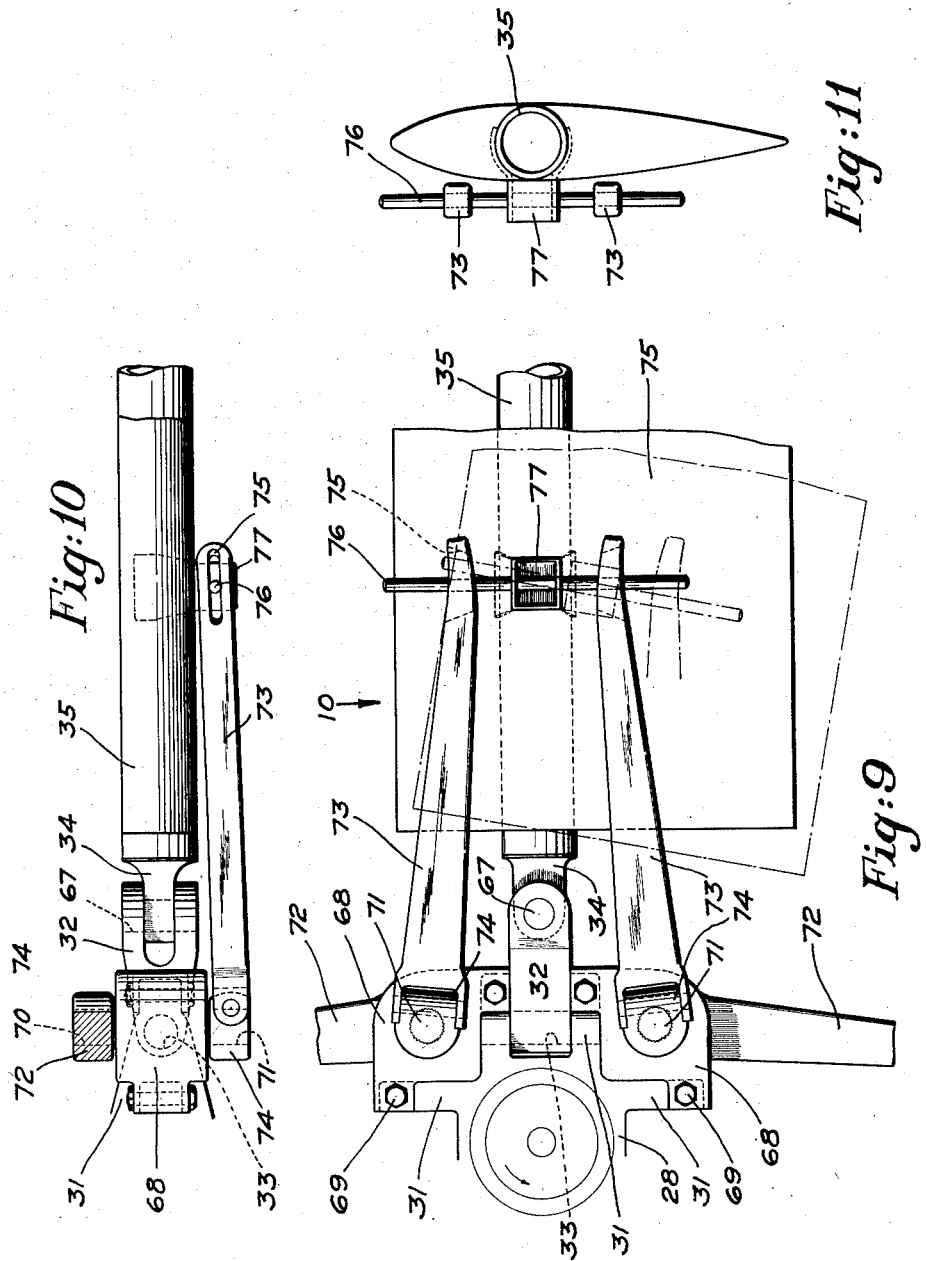
INVENTOR
Agnew E. Larsen
BY
ATTORNEYS

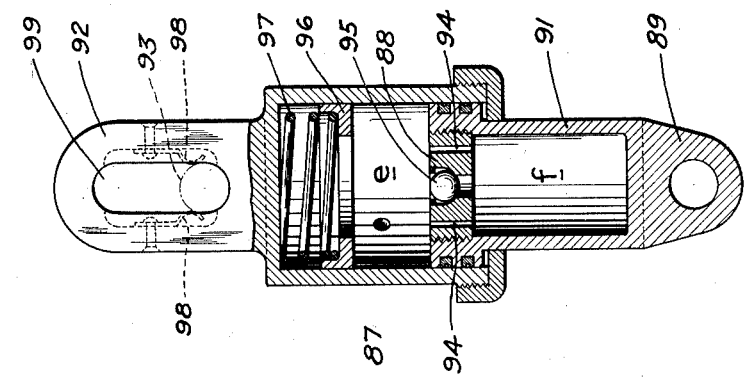
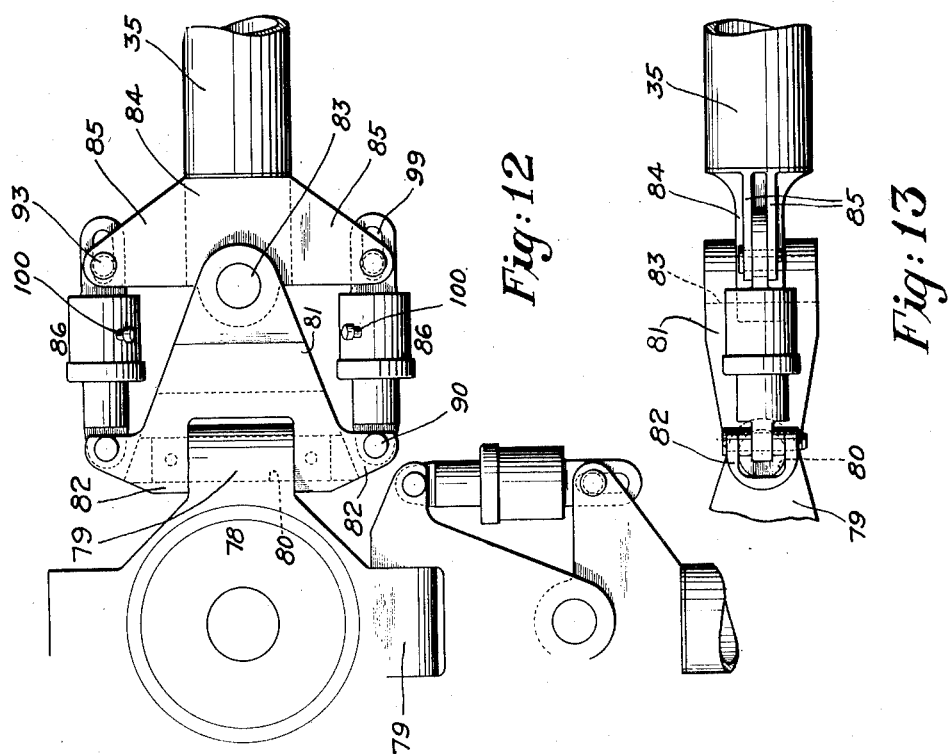

Patented Feb. 20, 1934

1,948,457

UNITED STATES PATENT OFFICE 1,948,457

AIRCRAFT SUSTAINING ROTOR

Agnew E. Larsen, Huntingdon Valley, Pa., assignor to Autogiro Company of America, Philadelphia, Pa., a corporation of Delaware Application June 29, 1931. Serial No. 547,691

25 Claims. (Cl. 244—19)

This invention relates to aircraft sustaining rotors and is particularly concerned with the multi-bladed type of rotor.

Aircraft including multi-bladed sustaining rotors are disclosed in the Patent No. 1,590,497 issued June 29th, 1926, to Juan de la Cierva, and also in the copending application of Juan de la Cierva, Serial No. 145,655, filed November 1st, 1926, now issued as Patent No. 1,859,584, dated May 24th, 1932.

As disclosed in the above noted patent as well as in the copending application referred to, sustaining rotors of the character here involved generally include means whereby the individual blades thereof may be free to assume various positions, under the influence of inertia, lift, drag and anti-drag and other forces to which they are subjected in flight operation. To this end each rotor blade is preferably pivoted or articulated to a central axis or hub mechanism to provide for individual movement of the blades both within as well as transversely of their general path of rotative travel about the central axis mechanism. At least under certain conditions or with craft of certain characteristics, it is desirable to control or partially restrict some individual blade movement. Heretofore such control has been obtained by the use of various devices among which might be mentioned blade interconnecting cables such as disclosed in the copending application of Juan de la Cierva, Serial No. 145,655, filed November 1st, 1926 (issued May 24, 1932, as Patent 1,859,584), Serial No. 498,298, filed November 26th, 1930 (issued October 25, 1932, as Patent 1,884,597), Serial No. 500,062, filed December 4th, 1930 (issued February 14th, 1933, as Patent 1,897,042).

Another type of blade movement control device, involving the use of resilient or rubber bumpers, is disclosed in the copending application of Juan de la Cierva, Serial No. 496,872, filed November 20th, 1930.

The present invention is primarily concerned with an improved mechanism or device which is adapted to restrict or control certain individual blade movements in rotors of the character here involved. Among the more important objects of the invention might be mentioned: Generally improved operation of devices of this type; reduction of parasite drag and the like in the rotor as a whole; simplification of construction and operation of the parts employed; and the provision of means for conveniently and readily adjusting the reaction or resistance of the device to blade movement.

How the foregoing objects and advantages are obtained together with others which will occur to those skilled in the art will be apparent from consideration of the following description taken with the accompanying drawings in which several different embodiments of the invention are illustrated.

Figure 2 is a top view of the root end of a rotor blade illustrating the device which is applied to the rotor of Figure 1, the view being on a substantially enlarged scale and including a fragmentary showing of the axis mechanism;

Figure 3 is a side view of the structure shown in Figure 2;

Figures 4 and 5 are views illustrating a certain detail of the structure of Figures 1 to 3 inclusive;

Figure 1:
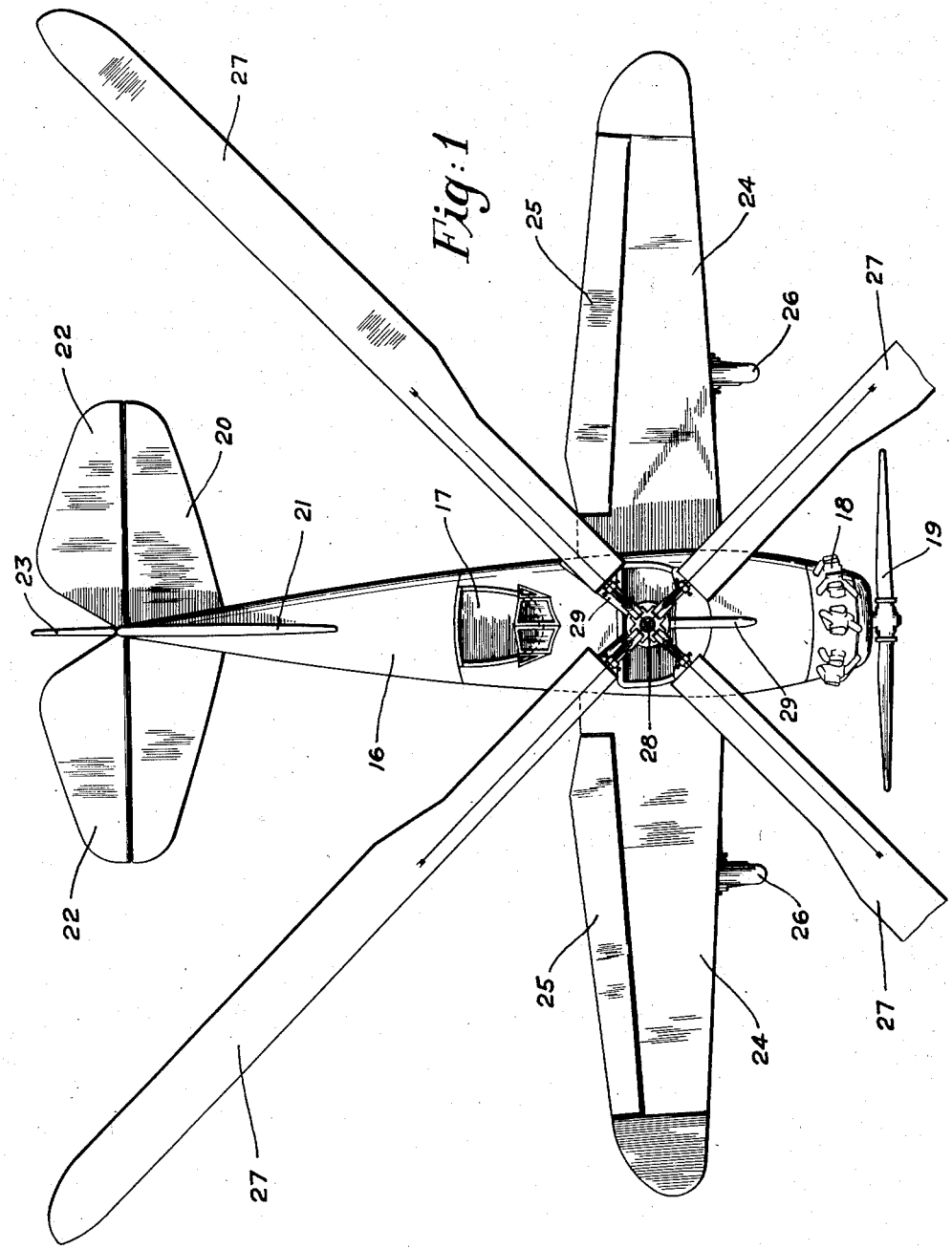
Figure 1 is a top plan view of an aircraft having a rotor embodying one form of device herein disclosed, certain rotor blades being broken away in this view.

Figures 6, 7 and 8 are plan, vertical section and horizontal views, respectively, of a portion of the device of Figures 2 and 3, these views being made on a still further enlarged scale and Figure 8 being taken as indicated by the section line 8—8 on Figure 7;

Figures 9 and 10 are views similar to Figures 2 and 3 but illustrating a modified blade-movement control device, Figure 10 being taken in the direction of the arrow 10 applied to Figure 9;

Figure 11 is a somewhat diagrammatic outer end view of a portion of a blade having the device of Figures 9 and 10 applied thereto;

Figure 12 is a top plan view of a portion of the root end of a blade together with a portion of the associated axis mechanism, this view illustrating the application of a still further modified blade-movement control mechanism;

Figure 13 is a side view of a portion of the structure illustrated in Figure 12; and Figure 14 is a view illustrating certain details of the structure of Figures 12 and 13.

Referring now particularly to Figure 1, it will be seen that the aircraft here illustrated includes a body or fuselage 16 which may be provided with one or more cockpits 17. At the forward end of the fuselage, propelling means including an engine 18 and a propeller 19 is arranged, while at the rear end I have provided an empennage embodying the usual fixed surfaces 20 and 21 and the usual control surfaces 22 and 23.

If desired the craft may further be provided with relatively small laterally extended fixed surfaces 24 on which the aileron controls 25 are mounted. Suitable landing gear including wheels 26 is disposed substantially below the fixed surfaces 24.

While some lift is afforded by the fixed surfaces 24 during forward flying, especially at high speeds, the rotor mounted above the body of the craft affords the major portion of the lift at all times and substantially the entire lift when making vertical or substantially vertical descent. As seen in Figure 1 the sustaining rotor includes a plurality of blades 27 which are mounted for common rotation about the axis member indicated at 28. The axis mechanism may suitably be supported above the body of the craft by means of a pyramid or pylon structure having upwardly converging supporting leg members 29. In order to provide for the common rotation above referred to, the central hub or axis member 28 is constructed in such manner as to be connected with the individual blades 27 by means of pivot joints or parts.

As appears more clearly in Figures 2 and 3, the interconnection between each blade and the central hub 28 includes pairs of apertured lugs or ears 31 adapted to engage the joint or pivot part 32 which is similarly apertured in order to permit the passage of the pivot pin 33 therethrough as well as through the lugs 31. Additionally, the outer end of the joint part 32 is forked to receive the apertured lug or ear 34, the latter being secured to the root end of the blade spar 35. This joint provides for blade movement substantially within the general path of travel thereof, the joint itself being completed by means of the pivot axis structure 36 which will be described more in detail below in connection with other parts illustrated in Figures 6, 7 and 8.

Making reference now to these three figures, it will be seen that in accordance with the present invention as here embodied, the mechanism employed for controlling or restricting certain of the individual blade movements includes a hydraulic damping or cushioning device which, as will appear just below, is non-rebounding or non-resilient in character. This device is enclosed, in large part, within a casing 37 which may be provided with apertured corner flanges 38 to facilitate attachment thereof to the blade joint part 32 (see Figs. 2, 3 and 6). The attachment, as clearly illustrated in Figures 2 and 3, may suitably be by means of bolts 39 which take into one arm or fork of the part 32.

Referring again to Figures 7 and 8, it should be noted that the casing 37 is divided into a plurality of chambers by means of a fixed baffle element having diametrically arranged members 40 projecting from a central cylindrical part 41. This partition or baffle wall fits snugly against the internal wall 42 at the side of the casing 37 and also rests or abuts against the bottom wall 43 thereof. The baffle elements 40, furthermore, are rigidly fixed within the casing as by means of pins 44 which fit in suitably drilled holes formed partly in the casing wall 42 and partly in the elements 40.

The upwardly projecting part 36 which constitutes the pivot pin or axis structure for blade movements within the general path of travel, extends downwardly into the casing 37 and is enlarged into a circular part 45. This part 45 is received between upwardly extended portions of the fixed partition walls 40—40 and also abuts against the upper surface of the cylindrical part 41. Still further, the enlarged circular part 45 carries outwardly and downwardly extended members 46 which are positioned for rotative movement in the arcuate pockets formed in the casing by the baffle means 40.

In order to retain various of the foregoing parts in their operative positions within the casing 37, an annular ring or collar-like device 47 is fitted within the casing above the parts 40 and 45 and retained in place by means of the threaded ring 48. At this point it should be noted that the collar 47 is provided with an upwardly extended flanged portion 49 providing a packing receiving socket 50 around the central pin 36. The chambers formed in the casing below the retaining collar 47 are adapted to be filled with any fluid suitable for use in hydraulic damping devices. Oil, of course, is preferable, and may be introduced through a filling hole 51 which communicates with an annular storage or supply chamber 52 formed above the collar 47 and below the top closure plate 53. From this point the oil may flow through the ball valve devices, one of which is indicated at 54 in Figure 7, into the chambers formed in the lower part of the casing. These ball valves, of course, are arranged to permit the flow of fluid into the operating chambers and prevent escape of liquid therefrom. Any leakage of oil upwardly along the pivot pin 36 is taken care of by the return groove and passage 52a—52b.

The central or movable part of this structure, preferably in the enlarged portion 45 thereof, is provided with an axial or centrally disposed cavity or chamber 55 from which radial ducts 56 and 57 extend to communicate with the various chambers formed between the baffle elements 40 and 46. Additionally, the central bore or aperture 55 is threaded to receive a similarly threaded part 58 of the control valve 59. This valve, as appears most clearly in Figure 7, has its lower end extended as at 60 in order to engage the lower inclined or conical wall of the cavity 55 and thus control flow of damping fluid between the ducts 56 and 57, it being noted that those numbered 56 are arranged below the point of seating of the valve part 69, while those numbered 57 are arranged above this seating point. The upper end of the valve 59 may be suitably packed as by means of a gland 61. At this point it should be noted that while the valve as illustrated in Figure 7 has completely closed off communication between ports or passages 56 and 57, during all normal operation the valve will be adjusted to a point which will permit flow between passages 56 and 57.

Before considering the operation of the damping device just described, reference should again be made to Figures 2 and 3 in which the upper squared end 62 of the pin 36 is received in a similarly squared aperture formed at one end of the arm or lever 63. This lever is extended substantially lengthwise of the blade and is received between the portions 64—64 of a strap or clamp structure 65, the latter being rigidly secured to the blade shank or spar 35 (see Figs. 4 and 5). This clamp structure is provided in order to transmit blade movements on the pivot axis 36 to the lever 63. At each side of the lever 63 the bracket parts 64 are threaded to receive adjustment bolts 66 which may be advanced to rigidly secure the end of the lever 63 with respect to the blade spar (as shown in Fig. 5) or which may be more or less withdrawn to permit some relative movement between the lever 63 and the blade spar. The purpose of this will be considered more in detail hereinafter.

The operation of the blade-movement control device illustrated particularly in Figures 2 to 8 inclusive is substantially as follows:

When a blade, during flight operation, is moved about its substantially vertically disposed pivot axis 36, the lever 63 is also moved, thus rotating the baffle parts 46 of the damping device in one direction or the other within the chambers provided in the casing 37. Assuming, for example, that the movement of the parts 46 is clockwise when viewed as in Figure 8, the damping fluid contained in the chambers indicated at $a$ and $b$ will be forced radially inwardly through the passages 57 to the central chamber 55. From this point the liquid or oil will flow outwardly through the passages 56 and into the chambers $c$ and $d$, providing, of course, that the valve part 60 is suitably adjusted to permit this flow. In view of the restricted cross sectional area of the various passages (this being controllable by the valve 59) a relatively retarded flow is provided for, and relative movement of the casing and the baffle elements 46 is resisted.

In view of the fact that the casing as well as the partitions or walls 40 are fixed with respect to the blade pivot part 32, the blade movement above referred to will also be resisted or restricted.

It should be noted in connection with this device that the blade-movement control or resistance is non-rebounding or non-resilient in character, this being desirable, for example, as it reduces the tendency to set up more or less violent, and sometimes undesirably synchronized, blade movements.

Referring again to the adjustable bolt devices 66 illustrated in Figures 2 to 5, it should be noted that with craft of certain characteristics, or at least under certain operating conditions, it is desirable to allow the blades to move, within a certain angular range, entirely freely. That is, under certain conditions it is preferable to restrict blade movements only after deflection thereof a few degrees to one side or the other of the central or mid position. This freedom is permitted by adjustment of the bolt devices 66 in the manner illustrated in Figure 4. The blade spar 35 with its ear 34 may then pivot, to a certain extent, around the axis 36 before the arm 63 and the resistance mechanism comes into play.

On the other hand, some circumstances may make it desirable to restrict all blade movement, in which case the bolts 66 may be adjusted as illustrated in Figure 5.

Still further, while the present invention is particularly concerned with the application of damping devices in such manner as to restrict individual blade movements on their substantially vertically disposed pivot axes, it should be understood that, if desired, the device already described, as well as the mechanisms considered herebelow, may also be applied in such manner as to control or restrict individual blade movement on the substantially horizontally disposed pivot axes.

The modified structure illustrated in Figures 9 to 11 inclusive, similarly to Figures 1 to 8 inclusive, is applied to the blades in order to control movement thereof on their substantially vertically disposed pivots. In these views a rotor hub structure is illustrated again by the reference numeral 28, each blade also being horizontally pivoted to the hub by means of the parts 31, 32 and 33. In accordance with the showing of Figures 9 to 11 inclusive, however, a vertical pivot pin 67 is employed at the juncture of the part 32 and the ear 34, the latter of which is secured to the root end of the blade spar 35.

This structure also makes use of a hydraulic damping device similar to that illustrated in Figures 6, 7 and 8; in this instance, however, a number of these devices are mounted on the hub structure 28 within the casings 68. The attachment of these casings may be by means of bolts 69 extended through apertures formed in the outer end portions of the lugs 31. As best seen in Figure 9 one of the damping devices and its enclosing and supporting housing 68 is disposed between each pair of blades around the hub. The two relatively rotatable parts of the damping device are here operatively connected with the upwardly and downwardly extended shafts or pins 70 and 71. The upwardly and downwardly extended pins 70 and 71 are connected, respectively, with upper and lower levers 72 and 73, the connection in each instance including a pivoted joint indicated at 74 which is arranged to permit each individual lever to swing vertically with respect to the hub structure.

In Figure 9 it will be seen that the various levers are arranged in pairs 72—72 and 73—73, each pair being extended outwardly of a blade spar 35 to cooperate therewith in restricting individual blade movement on the vertical pins 67. In Figures 9 and 10 a pair of levers 73—73 is illustrated as extending outwardly somewhat above a blade spar 35, the levers being offset to different sides of the spar. At their outer ends the levers are provided with elongated apertures or slots 75 which are adapted to receive the transversely extended pin 76. This pin is carried on the blade spar by means of an upwardly projecting bracket device 77.

It will be understood, of course, that the levers 72 are similarly arranged in pairs although these levers will be extended somewhat below blade spars 35 of adjacent blades (not shown). The parts 76 and 77 for the lower levers, as will be apparent, will also be disposed below instead of above the blade spars.

During individual blade movement, when the blades are provided with the structure of Figures 9 to 11, the various outwardly projecting levers will be moved and will transmit such movement to their associated blade-movement damping or control devices. In this way various individual blade movements are restricted in a manner similar to that described above, it being noted, however, that this structure provides for reaction, through the damping devices, between adjacent blades.

According to the preferred arrangement the joint devices 74 which are associated with the pins 70 and 71 are provided with a plurality of cooperating grooves and ridges to permit relative adjustment thereof. In this way the normal spacing between the ends of the operating levers of each pair and also the spacing of these levers from the device 77 may be varied in order to provide for restriction of all individual blade movement, within the general path of rotation, or to provide for movement of the blades, within certain angular limits, entirely free of restriction or control. In Figures 9 and 11 the levers 73 are clearly illustrated as being adjusted to provide clearance on each side of the device 77, so that the blade spar may move a certain distance before operating the resistive means.

The structure illustrated in Figures 12 to 14 inclusive, includes a somewhat modified rotor hub member 78, this hub being provided with outwardly extending blade attachment members 79 each with a substantially horizontal bearing opening arranged to receive a pivot pin 80. A blade pivot part 81 has inwardly and laterally extended portions 82—82 between which the bearing block 79 is received, the pin 80 also being projected into apertures formed within the extensions 82 (see Fig. 12). The outer end of the link or pivot part 81 is forked and each portion of the fork apertured to receive the vertical pin 83. The blade spar 35 is secured to the joint part 81 by means of this pin 83, an apertured ear 84 being interposed between the blade spar itself and the vertical pin.

Additionally, in accordance with this embodiment, the part 84 is laterally provided with a pair of webs 85 on either side of the spar 35, and at each side of the blade spar a damping device 86 is interposed between the spaced parts 82 and 85.

As appears most clearly in Figure 14, this device is of the cylinder and piston type, the former being indicated at 87 and the latter at 88. The trunk portion 91 of the piston 88 carries an apertured ear 89 adapted to be secured to one of the arms 82 by means of a pin 90 (see Fig. 12). The cylinder 87, furthermore, has a slotted eye 92 for purposes of attachment to an extension 85 as by means of a pin 93.

This device is also adapted to work hydraulically and with this in mind the interior of the cylinder 87 and the trunk 91 are partially filled with suitable damping medium such as oil. The two chambers between which the restricted flow takes place during damping action, i. e., during relative movement of the cylinder and piston 87 and 88, are disposed one within the cylinder itself (e) and one within the trunk 91 of the piston (f). Communication between these two chambers is provided for by the passages 94 as well as through the one-way valve device 95.

Additionally, a centrally apertured plunger 96 is arranged in one end of the cylinder 87 and spring pressed, by means of coil spring 97, toward the piston 88.

In considering the operation of this device it should be borne in mind that the chambers e of cylinders 87 are disposed outwardly from the center of rotation beyond the chambers f of the piston trunks 91. Centrifugal force during rotor operation, therefore, tends to maintain at least the major portion of the damping medium in the outer chambers e, flow in this direction being substantially unrestricted by virtue of the flow through the ball valves 95. Furthermore, when the blades are at rest they are normally supported in somewhat "drooped" positions with the result that flow to the chambers e with the rotor at rest will be by gravity.

Assume now that a blade movement occurs in a direction to cause movement of the trunk 91 and piston 88 into the cylinder 87 from the position shown in Fig. 14. During this movement, liquid contained in the chamber e will be forced through the passages 94 into the chamber f. Here, however, the flow is considerably restricted so that the blade movement will correspondingly be restricted. Note also that no liquid will flow from chamber e to chamber f through the valve device 95 as this device is arranged in such manner as to be closed by pressure in chamber e.

Relative separation of the cylinder 87 and the trunk 91 is not subjected to any material restriction in view of the fact that during this movement the pressure in chamber e is reduced thus causing ball valve device 95 to open and permit substantially unrestricted flow of liquid from chamber f to chamber e.

It will be observed in connection with this arrangement that, as shown in the drawings and described above, each damping device is primarily effective to restrict blade movement in one direction only. The arrangement of a separate device at each side of each blade, however, takes care of blade movements in both directions.

If desired, only one of the damping devices 86 may be associated with each one of the blades. In this instance, however, the porting provided between chambers e and f would be somewhat modified in order to provide for restricted flow in both directions.

Referring again to Figure 14 and the relation of the pin 93 to the slotted ear 92, attention is called to the disposition of spring elements 98 having curved portions disposed adjacent one end of the slot 99 in position to engage the pin 93 and retain this pin at the end of the slot during movement of a blade from a deflected position to mid position. The effect of this is to assist centrifugal force in returning the piston 88 and cylinder 87 to the relative positions illustrated in Figure 14 so that the device is prepared for a subsequent damping operation. The springs 98, of course, are not strong enough to interfere with disengagement of the pin 93 when a blade deflection occurs toward the other side or in the opposite direction. It will be readily seen that by changing the relationship between the slots 99 and the pins 93, for example, by providing a plurality of holes in the webs 85, in either of which the pins 93 may be inserted, this form of mechanism (illustrated in Figures 12 to 14) can also readily be arranged to provide unrestricted blade movement for a given number of degrees before the pin 93 contacts with the end of slot 99 for operating the damping device.

The spring pressed plunger 96 may be arranged in such manner as to afford an additional cushioning effect toward the end of the damping stroke of the associated piston. Additionally, a connection 100 may be provided for delivery of oil or other damping fluid to the cylinder 87. In the preferred arrangement, this connection 100 is positioned somewhat below the top of the cylinder 87 (see Figs. 12 and 14). When so disposed, such a connection may be employed as an automatic gauge for the amount of oil maintained within the chambers e and f. For example, when the oil supply is being renewed, after delivering oil through the connection, it may be opened to the atmosphere in order to permit any excess to flow out. Filling of the chambers e and f to the proper point, therefore, is provided for in a simple and convenient manner.

According to the foregoing the present invention makes provision for control or restriction of individual blade movements, especially on their vertically disposed pivot pins, by the use of devices which are simple as well as effective in operation. Blade interconnecting cables such as those employed heretofore for this purpose become unnecessary, with the result that a more efficient rotor structure, from the standpoint of parasite drag and the like, is provided.

The use of hydraulic damping devices in structures of this character is advantageous as relatively great resistance values may be obtained even when employing only relatively small and compact parts and short lever arms from the center of rotation. Note that the overall dimensions of the blade roots and axis or hub mechanism are increased only by relatively small parts and operating members extended outwardly from the hub adjacent the blade roots.

Note also that the disposition of the blade-movement control mechanism adjacent to the rotor head structure results in the elimination of parts projecting from and secured to the blades except in the immediate vicinity of the hub. In view of this, the surfaces of the effective lift producing sections or portions of the blades, i. e., their outer portions, remain entirely smooth and regular. The structures of the present invention are also conveniently located for purposes of inspection, repair or adjustment.

All forms of the invention further involve the important advantage of conveniently providing for any desired position or offset of the vertical pivot axes of the blades, for example, in accordance with the teaching of the copending application of Juan de la Cierva, Serial No. 622,635, filed July 15th, 1932.

Finally, all forms keep the damper operating means closely adjacent the blade spar so as to minimize tendency to twist the blades on their pivots.

As to the form of the invention shown in Figures 1 to 8, it will be observed that this has the advantages of a minimum number of parts, a single damping device and operating arm for each blade, independence of the device from the rotor hub and from other blades, and the utilization of the damping device itself as an articulation for the blade.

The form of the invention shown in Figures 9 to 11 embodies the specific advantages of convenience in removing and replacing the blades, which might be done by the mere removal of the pins 67 and 76 without disturbing any of the damping mechanism, and the double utilization of each damping device by virtue of the fact that each of said devices is directly operative upon the two adjacent blades.

The construction shown in Figures 12 to 14, in common with the construction of Figures 1 to 8, provides the advantage of having the damping devices move with the blades, during swinging on the horizontal blade pivots, which avoids the necessity of pivoting the operating arms on supplemental transverse pivots such as the pivots 74 which are required in the construction of Figures 9 to 11. Furthermore, this form entirely eliminates any reaction tending to twist the blades with respect to their pivots, since the reaction of the arms is in a central horizontal plane through the longitudinal blade axis.

What I claim is:—

1. In an aircraft having a sustaining blade mounted for rotation about a substantially vertically disposed axis, a blade joint providing for movement in addition to the rotary movement substantially within the general path of rotative travel, said joint including an axis structure providing for pivotal movement, and a device for controlling pivotal movement arranged to react through said axis structure.

2. A rotatably mounted air-actuated rotor including a blade having a pivot joint, a pivot axis structure, and means for resisting pivotal blade movement, said structure being operatively associated with said means with the latter arranged to react through the former, together with resistance adjusting means associated with said structure.

3. A rotatably mounted air-actuated rotor including a blade having a pivot joint, a pivot axis structure, and means for controlling pivotal blade movement, said structure being operatively associated with said means, and at least a portion of said means being formed as a part of said pivot axis structure.

4. In an aircraft having a sustaining blade mounted for rotation about a substantially vertically disposed axis, a blade joint providing for movement in addition to the rotary movement, said joint including an axis structure providing for pivotal blade movement, and a device for controlling pivotal movement arranged to react through said axis structure.

5. In a construction of the character described, a rotatably mounted and jointed blade, and a hydraulic device for controlling blade joint movements, said device including a chamber for a fluid, and relatively movable baffle means adapted to react against blade parts at opposite sides of a blade joint and against each other through the fluid, together with an operating connection between a blade part and a baffle means, said connection being associated with a blade joint in such manner as to secure the joint parts together and serve as an axis structure for pivotal joint movement.

6. A rotatably mounted multi-bladed sustaining unit for aircraft including articulations for the blades providing for blade movement in addition to the rotational movement, and mechanism for controlling additional blade movement, a portion of said mechanism being disposed to serve as a pivot axis member for a blade articulation.

7. In a structure of the character described, a blade part and a blade joint part constructed to be pivotally secured to each other, and a device for controlling pivotal movement including a member pivotally uniting said parts, and members adapted to react against said parts during relative pivotal movement thereof, together with adjustable means providing for reaction at different relative positions of the said parts.

8. An aircraft including sustaining blades mounted for rotation about a common axis, pivot joints for the blades providing for substantially unrestricted pivotal blade movement, and fluid pressure means for restricting at least certain pivotal blade movements, said means being arranged for effective operation only after a predetermined pivotal blade deflection from the mid or normal position thereof.

9. An aircraft including sustaining blades mounted for rotation about a common axis, pivot joints for the blades providing for movement thereof in addition to their common rotation, and means for controlling pivotal blade movement, said means including opposed abutment means associated with blade parts at each side of a pivot joint and a fluid pressure device arranged to react between the opposed abutment means.

10. In a construction of the character described, a rotatably mounted and jointed blade, and a hydraulic device for controlling blade joint movements, said device including relatively movable baffle elements operatively associated, respectively, with relatively movable blade parts.

11. In a construction of the character described, a rotatably mounted and jointed blade, and a hydraulic device for controlling blade joint movements, said device including a chamber for a fluid, and relatively movable baffle means adapted to react against blade parts at opposite sides of a blade joint and against each other through the fluid, together with orifice means controlling the fluid resistance.

12. An aircraft including sustaining blades mounted for rotation about a common substantially vertically disposed axis, an axis structure, pivot joints interconnecting the blades and the axis structure, and non-rebounding means for resisting pivotal blade movements, said means being disposed adjacent said pivot joints.

13. A rotatably mounted multi-bladed sustaining unit for aircraft including articulations for the blades providing for blade movement in addition to the rotational movement, and mechanism for controlling additional blade movement, said mechanism including a non-rebounding damping device operative between blade articulation parts.

14. In an aircraft of the rotative blade type, a head structure including an axis mechanism for a plurality of blades, the blades being provided with pivot joints disposed near the head structure, and non-rebounding means for resisting pivotal blade movements, said means also being disposed, at least in large part, near the head structure.

15. In an aircraft of the rotative blade type, a head structure including an axis mechanism for a plurality of blades, the blades being provided with pivot joints disposed near the head structure, and means for resisting pivotal blade movements, said means being disposed in large part near the head structure and having an operating member extended generally outwardly therefrom to react with a blade beyond a pivot joint thereof.

16. In an aircraft of the rotative blade type, a head structure including an axis mechanism for a plurality of blades, the blades being provided with pivot joints disposed near the head structure, and means for resisting pivotal blade movements, said means being disposed in large part near the head structure and having an operating member extended outwardly generally lengthwise of the longitudinal axis of a blade to react therewith beyond a pivot joint thereof.

17. In an aircraft of the rotative blade type, a head structure including an axis mechanism for a plurality of blades, the blades being provided with pivot joints disposed near the head structure and arranged to permit blade movement substantially within the general path of rotative travel, and means for resisting pivotal blade movements, said means being disposed in large part near the head structure and having an operating member extended outwardly generally lengthwise of the longitudinal axis of a blade to react therewith beyond a pivot joint thereof.

18. An aircraft including sustaining blades mounted for rotation about a common axis, pivot joints for the blades providing for movement thereof in addition to their common rotation, and means for controlling pivotal blade movement, said means including opposed abutment means associated with blade parts at each side of a pivot joint and a non-rebounding movement resisting device arranged to react between the opposed abutment means.

19. An aircraft including sustaining blades mounted for rotation about a common axis, pivot joints for the blades providing for substantially unrestricted pivotal blade movement, and non-rebounding means for restricting at least certain pivotal blade movements, said means being arranged for effective operation only after a predetermined pivotal blade deflection from the mid or normal position thereof.

20. An aircraft including sustaining blades mounted for rotation about a common axis, pivot joints for the blades providing for substantially unrestricted pivotal blade movement, and mechanism for restricting at least certain pivotal blade movements, said mechanism including, for each blade, abutment means associated with the blade outwardly beyond a pivot joint and cooperating abutment means also disposed, at least in part, outwardly of the pivot joint.

21. An aircraft including sustaining blades mounted for rotation about a common axis, pivot joints for the blades providing for substantially unrestricted pivotal blade movement, and mechanism for restricting at least certain pivotal blade movements, said mechanism including, for each blade, abutment means associated with the blade outwardly beyond a pivot joint and cooperating abutment means also disposed, at least in part, outwardly of the pivot joint, the blade and cooperating abutment means being spaced from each other, when the blade is in substantially mid or normal position.

22. An aircraft including sustaining blades mounted for rotation about a common axis, pivot joints for the blades providing for substantially unrestricted pivotal blade movement, and mechanism for restricting at least certain pivotal blade movements, said mechanism including, for each blade, abutment means associated with the blade outwardly beyond a pivot joint and cooperating abutment means also disposed, at least in part, outwardly of the pivot joint, the blade and cooperating abutment means being spaced from each other, when the blade is in substantially mid or normal position, together with adjusting means for varying the degree of unrestricted pivotal blade movement permitted.

23. An air rotor construction including a central hub mounted for free rotation, blades or wings spaced thereabout in position for aerodynamic rotation about the axis of the central hub under the influence of relative airflow, and a mounting device for pivotally securing each blade or wing to said hub for swinging movements under the action of aerodynamic forces, said mounting device for each wing including a single lug secured to the hub and of substantial width in a direction tangential of the hub, and a forked member secured to the wing and embracing said single lug, with an axis member pivoting said fork to said lug on an axis lying substantially in a plane perpendicular to the axis of the hub, and a pivot paralleling the axis of the hub by which said forked member is secured to said wing at a point spaced outwardly from the first mentioned pivot, together with yielding means controlling wing pivot movements and positioned to react between the wing and the forked member, whereby an increase in strength of the hub and lug structure is obtained and ample clearance for operation of the control means and for swinging movements of the wings on both of their respective pivots is provided.

24. An aircraft including sustaining blades mounted for rotation about a common axis, pivot joints for the blades providing for blade movement in addition to the rotary movement, and a device for resisting pivotal blade movement operatively connected with a plurality of blades near the root ends thereof and reacting therebetween.

25. A rotatably mounted multi-bladed sustaining unit for aircraft including articulations for the blades providing for blade movement in addition to the rotational movement, and mechanism for controlling additional blade movement, said mechanism including a non-rebounding damping device operatively reactive between a plurality of blades adjacent the hub ends thereof.

AGNEW E. LARSEN.